J. G. CRAMER.
VEHICLE TIRE.
APPLICATION FILED JULY 24, 1906.
927,122.
Patented July 6, 1909.
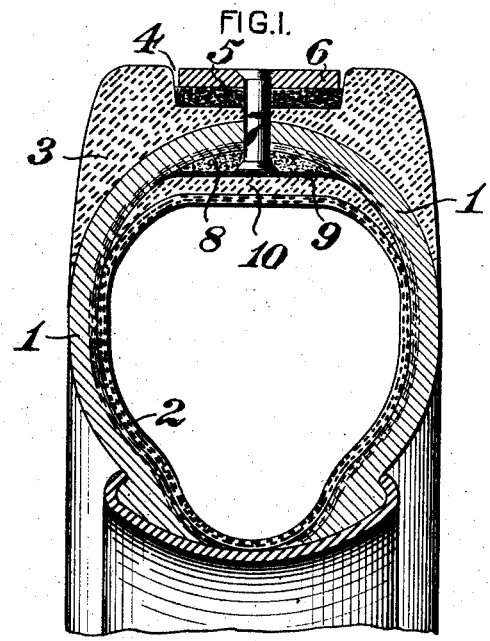
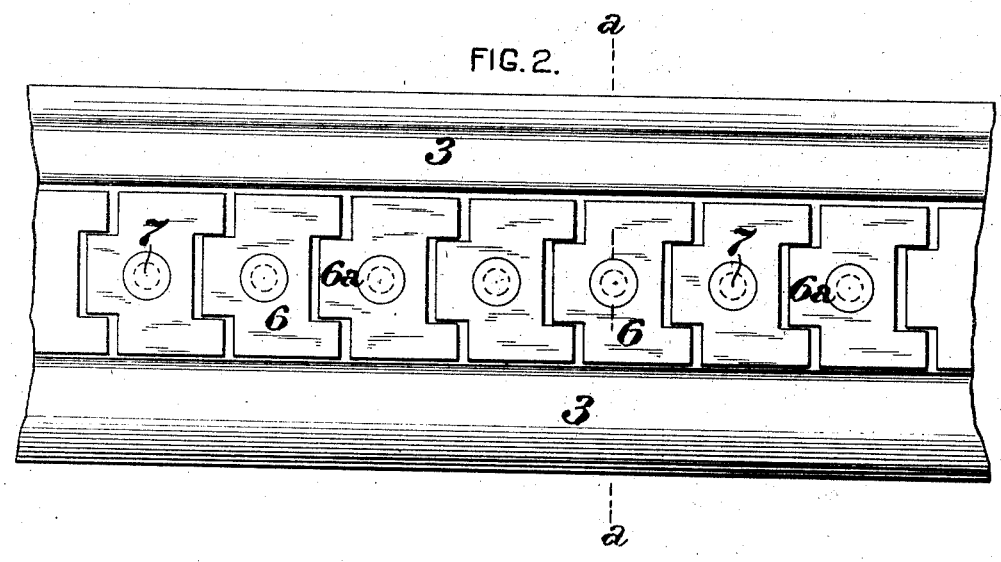
WITNESSES
INVENTOR

UNITED STATES PATENT OFFICE.

JESSE GRANT CRAMER, OF EAST ORANGE, NEW JERSEY.

VEHICLE-TIRE.

No. 927,122.

Specification of Letters Patent.

Patented July 6, 1909.

Application filed July 24, 1906. Serial No. 327,497.

*To all whom it may concern:*

Be it known that I, JESSE GRANT CRAMER, of East Orange, in the county of Essex and State of New Jersey, have invented a certain new and useful Improvement in Vehicle-Tires, of which improvement the following is a specification.

My invention relates to tires for motor cars, bicycles, and other vehicles, of the tubular or pneumatic type, and its object is to provide, in a tire of such character, means, of simple and inexpensive construction and ready applicability in connection with the ordinary forms, whereby puncture of the tire and skidding or side slipping will be effectually prevented, without impairing the resiliency of the tire in service.

The improvement claimed is hereinafter fully set forth.

In the accompanying drawing: Figure 1 is a transverse section through a pneumatic tire, illustrating an application of my invention; and, Fig. 2, a partial face view of the same.

In the practice of my invention, the tubular tire body 1, is, as heretofore, composed of rubber, and may be of any of the forms ordinarily used in tires of this general type, and is, as usual provided with an inner tube, 2. A thread, 3, of rubber, is secured, as by being vulcanized, to the periphery of the tire body, 1; the outer face of the tread having a central groove or recess, 4, on opposite sides of which the face is substantially plane in cross section, and its entire width is slightly less than that of the tire body. A supporting band or ring, 5, of tough and flexible material, such as leather, is fitted in the groove, 4, of the tread, the thickness of the band, 5, being about one half the depth of the groove.

A plurality of independently attachable and detachable interlocking protecting plates, 6, of metal, preferably tempered steel, are disposed in the space within the groove 4, exterior to the band, 5, the plates, 6, being of such thickness that their outer sides shall be substantially flush with the outside of the tread, 3, so as to constitute, together with the portions of the periphery of the tread on each side of the groove, the bearing surface of the tire on the road. Each of the protecting plates, 6, has a central tongue, 6ª, which fits in a corresponding groove in the adjoining plate, so as to prevent relative lateral movement of the plates in the groove, 4, of the tread, and slight spaces are left between the end portions of the plates, so as to allow of a limited degree of relative movement circumferentially.

Each of the protecting plates, 6, is secured to the tire by a central rivet, 7, the outer head of which is flush with the outer face of the plate, and which passes through the plate, through the inner supporting ring, 5, through the portion of the tread, 3, below the groove, through the tire body, 1, and through a band or ring, 8, of leather or analogous tough and flexible material, which is segmental in cross section and which fits against the inner surface of the tire body, 1. The inner head of the rivet is formed in the band, 8, and a thin protecting band or strip of leather, 9, is fitted against the band, 8, for the purpose of keeping the inner heads of the set of rivets out of contact with an inner band or ring, 10, of soft rubber, of substantially crescent shape in cross section, which is fitted inside of the strip, 9, and against which the inner tube, 2, bears when inflated. The purpose of the band, 10, is to guard against the possibility of chafing or wear of the inner tube by contact with the rivet heads or the harsher interior surface of the strip, 9.

It will be seen that under the construction above described, the major portion of the bearing surface of the tire is composed of metal plates which are so connected to the body of the tire as to constitute a flexible ring, which not only effectually protects the tire from puncture but also insures immunity from side slipping or skidding on mud, snow, or wet or greasy asphalt pavements, as well as on dry roads. The plates being independently and only centrally connected to the body of the tire, any of them, if broken or worn, may be readily detached and a new one substituted, whenever desired. Further, there being no metal in or on the side walls of the tire, the highest degree of resiliency may be attained and the plates being only centrally connected permits them to have a slight turning or pivotal movement so as to readily adapt themselves to any distortion of the rubber tread 3 from a vertical plane.

I claim as my invention and desire to secure by Letters Patent:

The combination of a tubular tire body, a tread of resilient material secured thereto and having a central peripheral groove, a supporting ring or band of tough and flexible material seated in said groove, a plurality of independently and centrally fastened metal protecting plates pivotally resting on the supporting ring and within the groove, means for interlocking said plates against lateral movement, a ring or band of tough and flexible material fitting the outer portion of the interior surface of the tubular body, a plurality of rivets, each passing through one of the protecting plates, the tread, and to and through the ring or band inside the tire body, and securing said protecting plates independently thereto, a protecting band or strip fitting inside the row of inner rivet heads, and a ring or band of resilient material fitting inside said protecting band or strip.

JESSE GRANT CRAMER.

Witnesses:
J. SNOWDEN BELL,
ELSIE M. HOPLER.